United States Patent
Onodera et al.

(10) Patent No.: US 8,405,655 B2
(45) Date of Patent: Mar. 26, 2013

(54) GEOMETRIC MODELING SYSTEM AND OPTIMIZATION METHOD FOR GEOMETRIC FITTING

(75) Inventors: Makoto Onodera, Mito (JP); Yoshimitsu Hiro, Yokohama (JP); Ichiro Nishigaki, Ishioka (JP)

(73) Assignee: Hitachi, Ltd., Tokyo (JP)

( * ) Notice: Subject to any disclaimer, the term of this patent is extended or adjusted under 35 U.S.C. 154(b) by 979 days.

(21) Appl. No.: 12/389,720

(22) Filed: Feb. 20, 2009

(65) Prior Publication Data
US 2009/0262110 A1 Oct. 22, 2009

(30) Foreign Application Priority Data
Apr. 21, 2008 (JP) ................. 2008-110410

(51) Int. Cl.
*G06T 15/00* (2011.01)
(52) U.S. Cl. ........ 345/420; 345/419; 345/423; 345/428; 703/2
(58) Field of Classification Search ............ 345/419, 345/420, 423, 428; 703/2
See application file for complete search history.

(56) References Cited

U.S. PATENT DOCUMENTS

| | | | | |
|---|---|---|---|---|
| 6,137,492 A | * | 10/2000 | Hoppe | 345/420 |
| 6,996,505 B1 | * | 2/2006 | Edelsbrunner et al. | 703/2 |
| 7,038,700 B2 | | 5/2006 | Kawaguchi et al. | |
| 7,280,109 B2 | * | 10/2007 | Hoppe | 345/423 |
| 7,538,769 B2 | * | 5/2009 | Hoppe | 345/428 |
| 7,589,720 B2 | * | 9/2009 | Zhou et al. | 345/423 |
| 7,609,262 B2 | * | 10/2009 | Olhofer et al. | 345/420 |
| 8,098,244 B2 | * | 1/2012 | Olhofer et al. | 345/419 |
| 2006/0235653 A1 | | 10/2006 | Onodera et al. | |

FOREIGN PATENT DOCUMENTS

| | | |
|---|---|---|
| JP | 03-070083 | 3/1991 |
| JP | 2003-108609 | 4/2003 |
| JP | 2003-132097 | 5/2003 |
| JP | 2006-301753 | 11/2006 |
| JP | 2008-090766 | 4/2008 |

* cited by examiner

*Primary Examiner* — Phu K Nguyen
(74) *Attorney, Agent, or Firm* — Antonelli, Terry, Stout & Kraus, LLP.

(57) ABSTRACT

A system is provided for creating a modified analytical model from an existing analytical model and CAD data (geometric model data) of the modified model to reduce the workload in creating geometric and analytical models. The system includes means for reading a geometric model and an analytical model which are to be modified; means for storing correlation data showing relations between geometric elements of the object geometric model and nodes of the object analytical model; means for modifying the object analytical model to create a modified analytical model; and means for extracting geometric elements of the object geometric model which do not include the nodes in the modified object analytical model related to the object geometric model's geometric elements extracted from the correlation data and performing geometric fitting so as to fit the extracted geometric elements to the nodes to create a modified object geometric model from the modified analytical model.

9 Claims, 15 Drawing Sheets

FIG. 15

| NODES | RELATED OBJECT GEOMETRIC ELEMENTS | | | | | | |
|---|---|---|---|---|---|---|---|
| N1  | P1  | E1  | E6  | E13 | F1 | F3 | F8 |
| N2  | E1  | F1  | F3  |     |    |    |    |
| N3  | P2  | E1  | E2  | E14 | F1 | F3 | F4 |
| N4  | P3  | E2  | E3  | E15 | F1 | F4 | F5 |
| N5  | E3  | F1  | F5  |     |    |    |    |
| N6  | P4  | E3  | E4  | E16 | F1 | F5 | F6 |
| N7  | E4  | F1  | F6  |     |    |    |    |
| N8  | P5  | E4  | E5  | E17 | F1 | F6 | F7 |
| N9  | P6  | E5  | E6  | E18 | F1 | F7 | F8 |
| N10 | E6  | F1  | F8  |     |    |    |    |
| N11 | P7  | E7  | E12 | E13 | F2 | F3 | F8 |
| N12 | E7  | F2  | F3  |     |    |    |    |
| N13 | P8  | E7  | E8  | E14 | F2 | F3 | F4 |
| N14 | P9  | E8  | E9  | E15 | F2 | F4 | F5 |
| N15 | E9  | F2  | F5  |     |    |    |    |
| N16 | P10 | E9  | E10 | E16 | F2 | F5 | F6 |
| N17 | E10 | F2  | F6  |     |    |    |    |
| N18 | P11 | E10 | E11 | E17 | F2 | F6 | F7 |
| N19 | P12 | E11 | E12 | E18 | F2 | F7 | F8 |
| N20 | E12 | F2  | F8  |     |    |    |    |
| N21 | E13 | F3  | F8  |     |    |    |    |
| N22 | E13 | F3  | F8  |     |    |    |    |
| N23 | E14 | F3  | F4  |     |    |    |    |
| N24 | E14 | F3  | F4  |     |    |    |    |
| N25 | E15 | F4  | F5  |     |    |    |    |
| N26 | E15 | F4  | F5  |     |    |    |    |
| N27 | E16 | F5  | F6  |     |    |    |    |
| N28 | E16 | F5  | F6  |     |    |    |    |
| N29 | E17 | F6  | F7  |     |    |    |    |
| N30 | E17 | F6  | F7  |     |    |    |    |
| N31 | E18 | F7  | F8  |     |    |    |    |
| N32 | E18 | F7  | F8  |     |    |    |    |
| N33 | F8  |     |     |     |    |    |    |

GEOMETRIC MODELING SYSTEM AND OPTIMIZATION METHOD FOR GEOMETRIC FITTING

CLAIM OF PRIORITY

The present application claims priority from Japanese Patent Application JP 2008-110410 filed on Apr. 21, 2008, the content of which is hereby incorporated by reference into this application.

FIELD OF THE INVENTION

The present invention relates to CAE (Computer Aided Engineering) systems which numerically simulate physical phenomena by numerical analysis using computers. More particularly, it concerns a technique for creating a modified geometric model from a modified analytical model, and a geometric fitting method in geometric modeling by a CAE system.

BACKGROUND OF THE INVENTION

In a product development, CAE is utilized to reduce the cost of development and the design time. In CAE, an analytical model is prepared from a geometric model created by a CAD (Computer Aided Design) system and intensity analysis, thermal analysis, or vibration analysis is conducted on the analytical model using an analysis method such as the finite element method or boundary element method. Creation of an analytical model in CAE requires a large amount of work because it involves the steps of creating a mesh model from the geometric model and specifying parameters and boundary conditions for each element of the mesh model.

With this background, techniques for reducing the workload in analytical model creation have been proposed. JP-A No. Hei03(1991)-70083 discloses a technique that CAD and CAE functions are integrated into one system to reduce workload in creating an analytical model.

Furthermore, JP-A No. 2006-301753 discloses a technique that creates a desired analytical model using an existing analytical model. In this technique, the geometric features of outer surface elements of the existing analytical model are recognized and size data (size constraint) for a modified shape is set so that the mesh is modified under the restrictions of the geometric features and size constraint. Geometric features, such as ribs and holes, can be added or deleted in the technique.

JP-A No. 2003-108609 discloses a technique that creates a desired analytical model using an existing analytical model, as the technique disclosed in JP-A No. 2006-301753. A plurality of correlated reference points are set for the outline of the analytical model to be created and the existing analytical model, and by moving the reference points based on the relations of the reference points and the mesh data of the existing analytical model, the mesh data of the existing analytical model is modified to create the desired analytical model.

If an existing analytical model can be used to create a desired one, the techniques disclosed in JP-A No. 2006-301753 and JP-A No. 2003-108609 considerably can reduce workload in analytical model creation because the steps of creating mesh data and setting boundary conditions are not needed.

As described above, CAE should achieve a reduction of workload in analytical model creation. To achieve this problem, the technique described in JP-A No. Hei03(1991)-70083 integrates CAD and CAE functions into one system. However, this technique has a drawback that it is necessary to create an analytical model again for each geometric modification with CAD, less practical in case of handling huge volumes of data.

On the other hand, the techniques disclosed in JP-A No. 2006-301753 and JP-A No. 2003-108609 are useful since they use existing analytical models to create desired analytical models. These techniques eliminate the need to create mesh data and specify boundary conditions by using existing analytical models to create desired analytical models. This leads to considerable workload reduction in analytical model creation.

However, while the techniques modify the geometry of an analytical model, they do not modify CAD data (geometric model data), which is usually created as an output of the design. Since this geometric model data is also used as manufacturing data, creation of a geometric model is essential in the design stage. Therefore, the techniques have a problem that a final product geometry must be created again by CAD.

The present invention has been made in view of the above circumstances. An object of the present invention is to provide a system and a method for creating a modified analytical model from an existing one and also generating CAD data (geometric model data) of the modified model in order to reduce workload in creation of geometric models and analytical models.

SUMMARY OF THE INVENTION

According to a first aspect of the present invention, a geometric modeling system includes means for creating a geometric model; means for storing the geometric model; means for creating a meshed analytical model to analyze the geometric model; means for storing the analytical model; means for specifying and reading a geometric model to be modified (hereinafter called "object geometric model") and an analytical model to be modified (hereinafter called "object analytical model") from the stored data; means for creating and storing correlation data showing relations between geometric elements of the object geometric model and nodes of the object analytical model; means for modifying the object analytical model and creating a modified analytical model; means for extracting nodes of the modified object analytical model from the correlation data, the nodes being related to geometric elements of the object geometric model, determining whether coordinates of the extracted nodes in the modified object analytical model are included in coordinates of the geometric elements of the object geometric model, and extracting geometric elements which do not include the extracted nodes; and means for performing a geometric fitting process so as to fit the extracted geometric elements to the nodes, and creating a modified object geometric model from the modified object analytical model.

According to a second aspect of the present invention, the geometric modeling system is configured to extract geometric elements which do not exist in a pre-modified object analytical model from the geometric elements of the modified object analytical model, pick up outer surface elements from a group of the extracted geometric elements to create outer shape data, and perform Boolean union operation of the outer shape data and the object geometric model data to create the modified object geometric model.

According to a third aspect of the present invention, the geometric modeling system is configured to extract geometric elements which do not exist in the modified object analytical model from the geometric elements of the pre-modified object analytical model, pick up outer surface elements from the group of the extracted geometric elements to create outer shape data, and perform Boolean difference operation of the outer shape data and the object geometric model data to create the modified object geometric model.

According to a fourth aspect of the present invention, an optimization method for geometric fitting is a method for fitting the geometry of a geometric model created by a CAD system to the geometry of a modified analytical model created by modifying an analytical model for analyzing the geometric model. The method includes the steps of calculating distance between a curved surface or curved line as a geometric element of the geometric model and nodes in the modified analytical model; dividing the curved surface or curved line and calculating a curvature scaling factor from curvatures at dividing points adjacent to each other; calculating difference between the curvature scaling factors before and after the optimization for geometric fitting; and determining parameters expressing the curved surface or curved line so as to minimize the distance and the difference of the curvature scaling factors.

Therefore, according to the present invention, a modified analytical model and modified CAD data (geometric model data) can be created from an existing analytical model, reducing the workload in creating a geometric model.

BRIEF DESCRIPTION OF THE DRAWINGS

FIG. 15 is an example of feature correlation data.

DETAILED DESCRIPTION OF THE PREFERRED EMBODIMENTS

Figure 1:
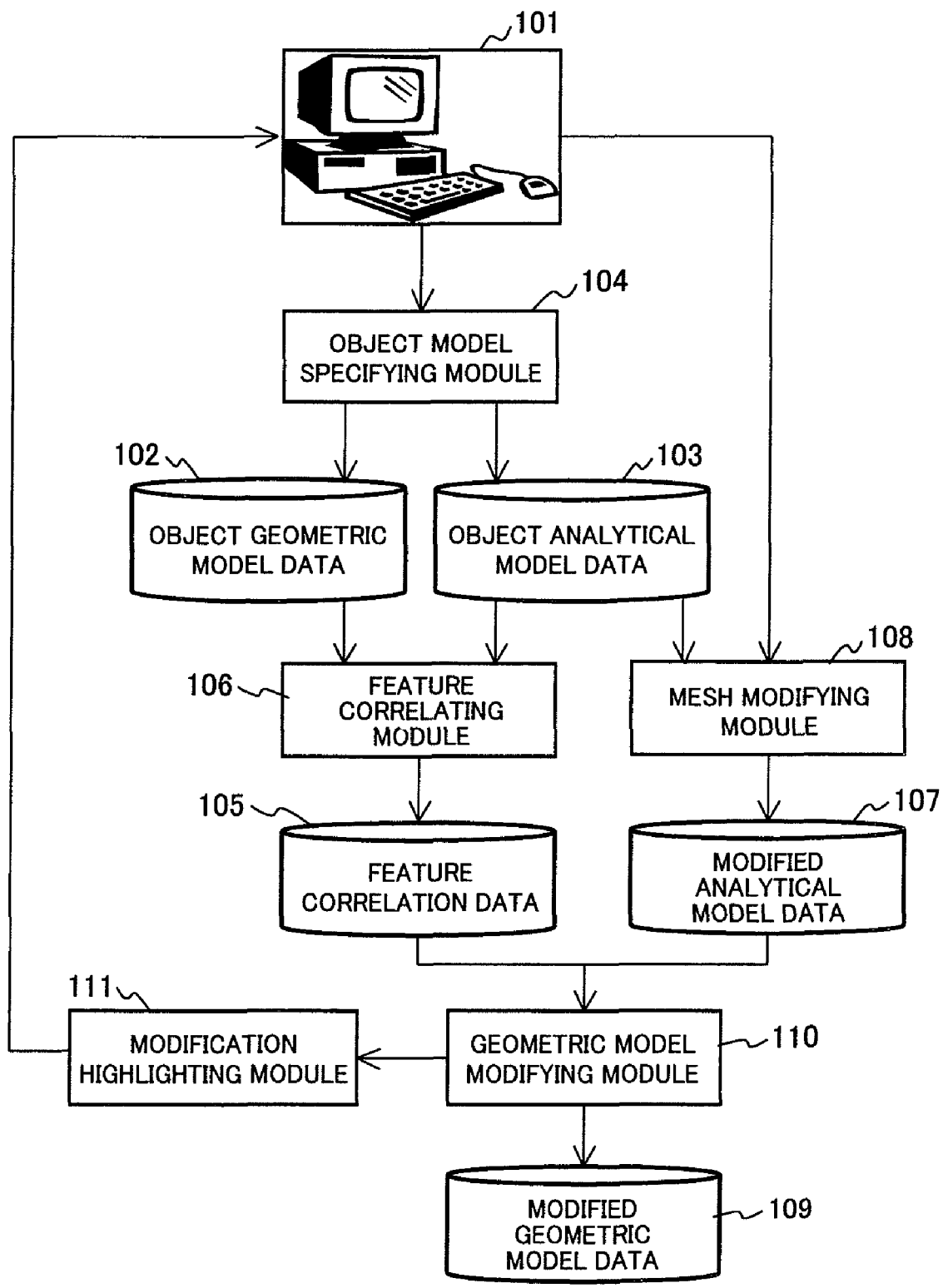
FIG. 1 shows a geometric modeling system according to the present invention.

1. Configuration of a Geometric Modeling System According to the Present Invention FIG. 1 shows the configuration of a geometric modeling system according to an embodiment of the present invention. The system includes an I/O device 101, an object model specifying module 104, a feature correlating module 106, a mesh modifying module 108, a geometric model modifying module 110, and a modification highlighting module 111. The system further includes a storage device (not shown) which can store and load object geometric model data 102 as data on the geometric model to be modified, object analytical model data 103 as data on the analytical model to be modified, feature correlation data 105, modified analytical model data 107, and modified geometric model data 109.

The I/O device 101 includes a keyboard, a pointing device, and a display which are used by the user of the geometric modeling system to enter and display data.

The object model specifying module 104 specifies the object geometric model data 102 and object analytical model data 103 which the user wants to modify.

The feature correlating module 106 determines feature relations between the geometric elements of the specified object geometric model data 102 (hereinafter called "object geometric elements") and the mesh of the specified object analytical model data 103 and stores them as feature correlation data 105. Here, geometric elements refer to surfaces, lines and points which constitute a geometric model.

The mesh modifying module 108 gives an instruction to modify the mesh of the object analytical model data 103 and stores the modified mesh data for the modified analytical model data 107.

The geometric model modifying module 110 extracts a node of the modified analytical model data 107 related to data on each object geometric element of the object geometric model, from the feature correlation data 105 and checks whether the extracted node is included in the coordinates of the object geometric element. If the node is decided to be not on the object geometric element (namely, the node is included in the mesh modified by the mesh modifying module 108), geometric fitting is performed so as to adjust the object geometric element data to the position of the node. The result of geometric fitting is stored for the modified geometric model data 109.

In addition, the geometric model modifying module 110 extracts elements of the modified analytical model data 107 which do not exist in the object analytical model data 103, namely geometric elements added to the object analytical model data 103 by the mesh modifying module 108, picks up outer surface elements from the group of elements to create outer shape data, creates the modified geometric model data 109 by geometric Boolean union operation of the outer shape data and the object geometric model data 102, and stores them.

Furthermore, the geometric model modifying module 110 extracts elements of the object analytical model data 103 which do not exist in the modified analytical model data 107, namely geometric elements deleted from the object analytical model data 103 by the mesh modifying module 108, picks up outer surface elements from the group of elements to create outer shape data, creates the modified geometric model data 109 by geometric Boolean difference operation of the outer shape data and the object geometric model data 102 and stores them.

The modification highlighting module 111 retrieves nodes in the modified analytical model data 107 which are related to object geometric element data of the object geometric model data 102, from the feature correlation data 105, extracts object geometric elements which do not include the nodes and highlights the extracted geometric elements on the display unit of the I/O device 101. In other words, the object geometric element data which is subject to geometric fitting by the geometric model modifying module 110 is displayed highlighted on the I/O device 101.

The modification highlighting module 111 creates outer shape data from elements of the object analytical model data 103 which do not exist in the modified analytical mode data 107 and elements of the modified analytical model data 107 which do not exist in the object analytical model data 103, and highlights the outer shape data on the display unit of the I/O device 101. In other words, the outer shape data of geometric elements added or deleted by the geometric model modifying module 110 is displayed highlighted on the I/O device 101.

An example of the processing sequence which is performed by the geometric modeling system according to the present invention is explained along with detailed description of each of the modules. As the geometric modeling system is started and an instruction to modify the analytical model is given through the I/O device 101, the object model specifying module 104 is started.

(1) Object Model Specifying Module

An example of the process which is performed by the object model specifying module 104 is explained below referring to FIG. 2.

Figure 2:
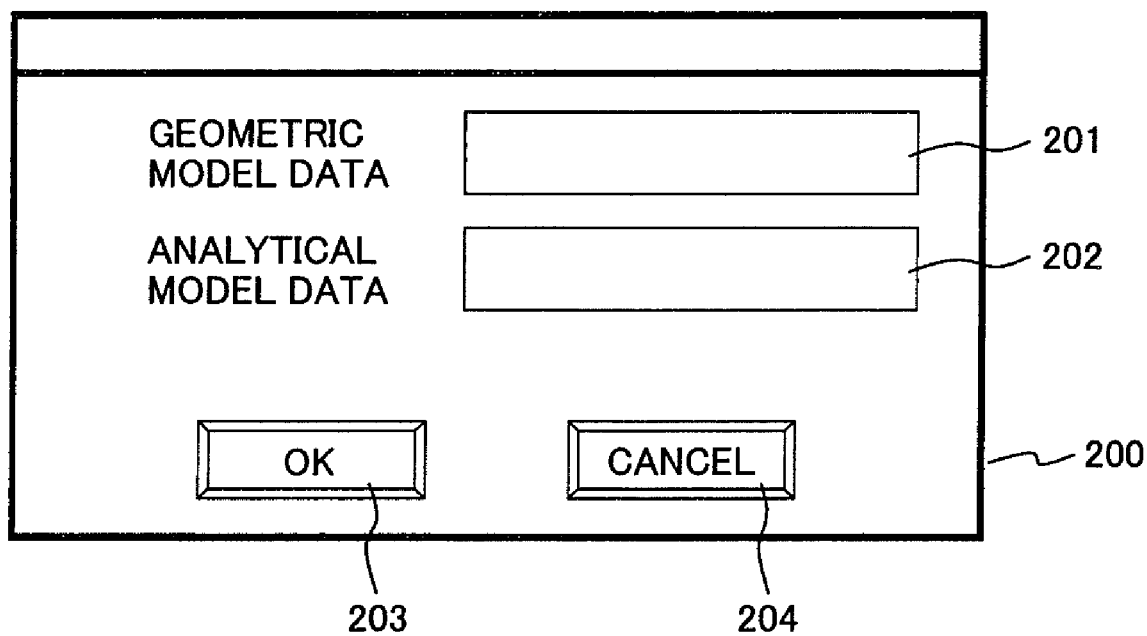
FIG. 2 shows an example of an object model specifying window.

The object model specifying module 104 displays an object model specifying window 200 shown in FIG. 2. The object model specifying window 200 includes a geometric model data input field 201, an analytical model data input field 202, an OK button 203, and a Cancel button 204.

The user of the system enters the filename of the object geometric model data 102 to be modified in the geometric model data input field 201, and the filename of the object analytical model data 103 to be modified in the analytical model data input field 202, using the I/O device 101.

When the user selects the OK button 203, the object model specifying module 104 loads the file having the filename entered in the geometric model data input field 201, as the object geometric model data 102, and the file having the filename entered in the analytical model data input field 202, as object analytical model data 103. When the user selects the Cancel button 204, the entered filenames are cancelled.

The object model specifying module 104 loads the object geometric model data 102 and the object analytical model data 103 from the storage device (not shown in FIG. 1) in the system. Alternatively, such data may be loaded from an external storage device connected to the system.

(2) Feature Correlating Module

An example of the process which is performed by the feature correlating module 106 is explained below referring to FIGS. 3 and 4.

The feature correlating module 106 investigates which geometric elements (surface, line, and point) of the object geometric model data 102 include which nodes on the outer surface mesh of the object analytical model data 103 and stores the relations between the nodes and geometric elements as feature correlation data 105.

Figure 11:
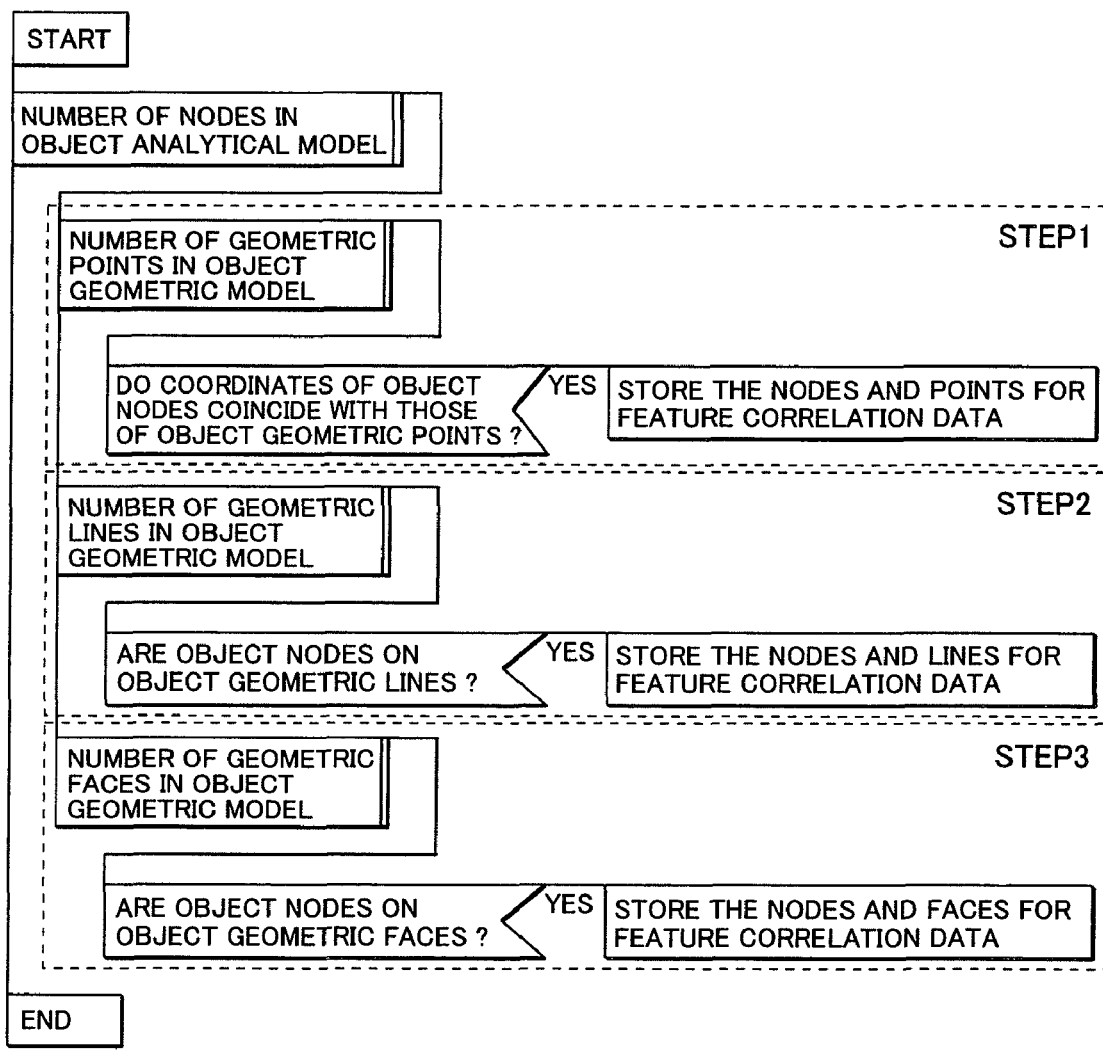
FIG. 11 is a PAD flowchart of a feature correlating module.

The process which is performed by the feature correlating module 106 is explained below referring to the PAD flowchart in FIG. 11.

First, regarding all nodes in the object analytical model data 103 (hereinafter called "object nodes") and all vertices in the object geometric model data 102 (hereinafter called "object geometric points"), object nodes and object geometric points which coincide with each other in terms of coordinates are stored for the feature correlation data 105 (STEP 1 in FIG. 11).

Then, regarding all the object nodes and all edges in the object geometric model data 102 (hereinafter called "object geometric lines"), object nodes which are included in object geometric lines are stored for the feature correlation data 105 (STEP 2 in FIG. 11).

Lastly, regarding all the object nodes and all surfaces in the object geometric model data 102 (hereinafter called "object geometric surfaces"), object nodes which included in object geometric surfaces are stored for the feature correlation data 105 (STEP 3 in FIG. 11).

Figure 3:
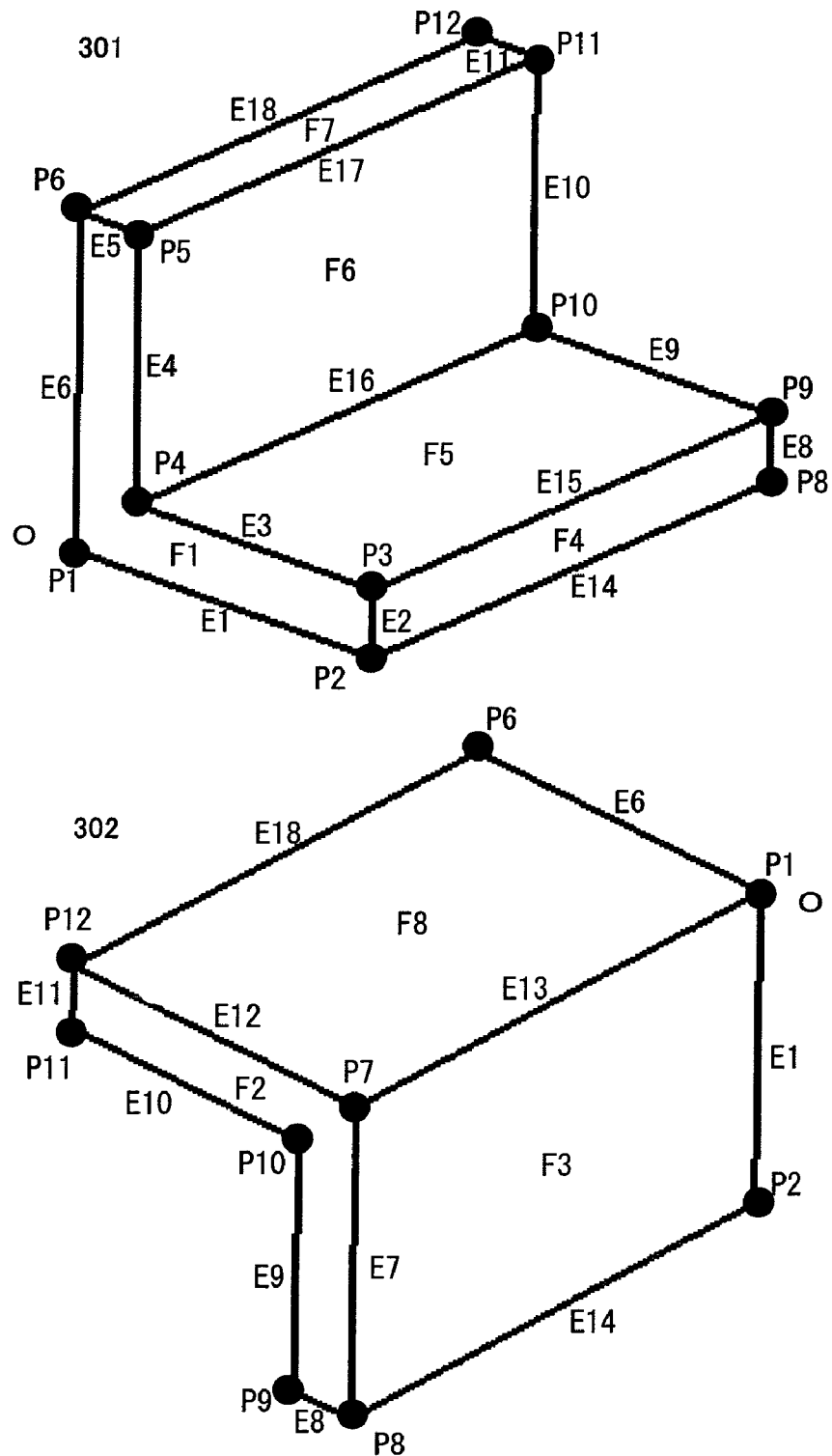
FIG. 3 shows an example of object geometric model data.
Figure 4:
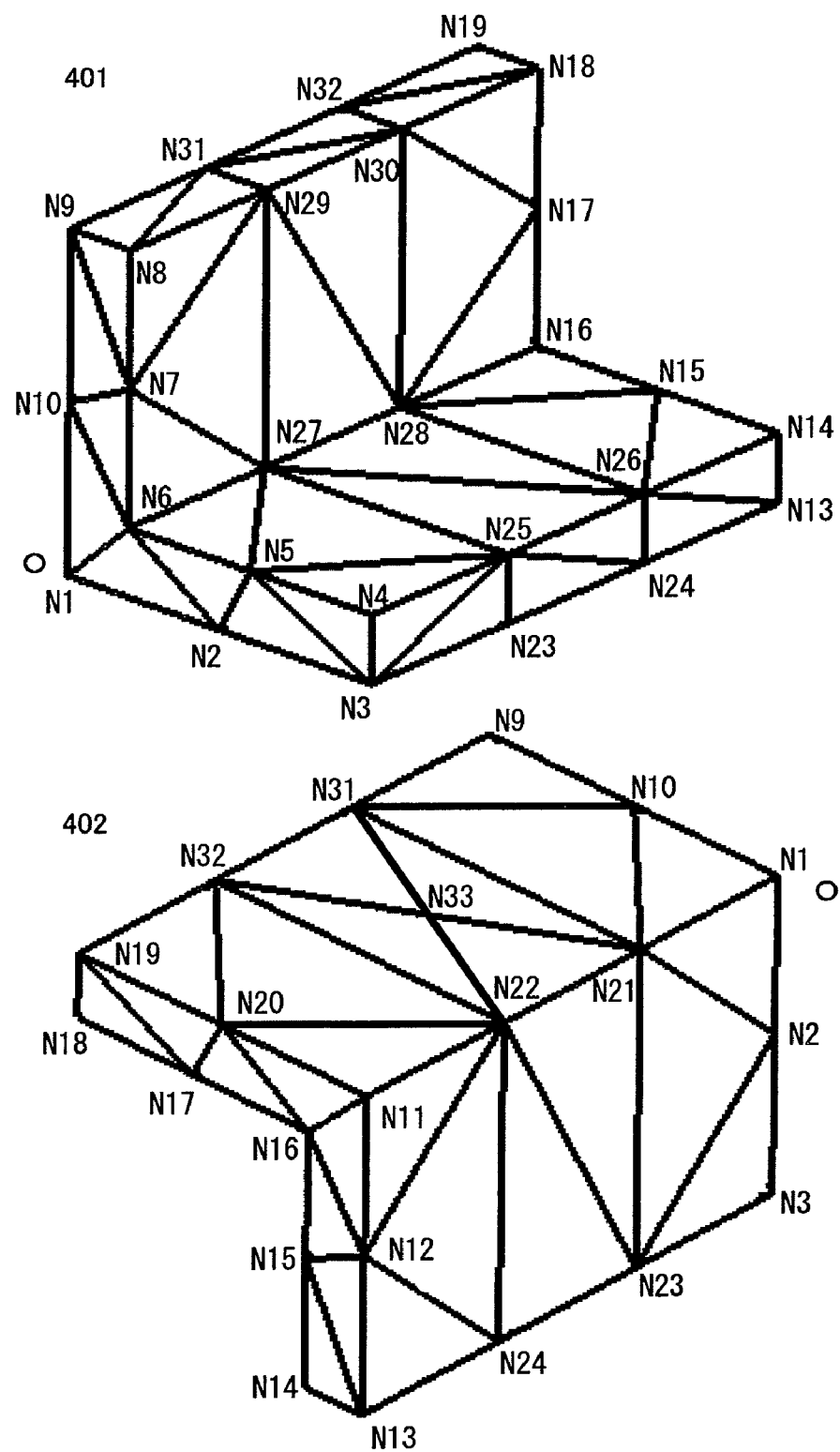
FIG. 4 shows an example of object analytical model data.

The feature correlating module 106 is explained by taking a case that the object geometric models 301 and 302 shown in FIG. 3 are specified for the object geometric model data 102, and the object analytical models 401 and 402 shown in FIG. 4 are specified for object analytical model data 103, as an example. The object geometric model 302 is the object geometric model 301 as viewed from the opposite direction and the object analytical model 402 is the object analytical model 401 as viewed from the opposite direction. Object geometric point P1 in FIG. 3 and object node N1 in FIG. 4 are at the origin O.

Since the coordinates of object node N1 in FIG. 4 coincide with those of object geometric point P1 in FIG. 3, object node N1 and object geometric point P1 are stored for feature correlation data 105. Object node N1 is on object geometric lines E1, E6, and E13 and also on object geometric surfaces F1, F3, and F8. Therefore, object geometric lines E1, E6, and E13 and object geometric surfaces F1, F3, and F8 are stored for feature correlation data 105 for object node N1.

Since object node N2 is on object geometric line E1 and on object geometric surfaces F1 and F3, object geometric line E1 and object geometric surfaces F1 and F3 are stored for the feature correlation data 105 for object node N2. Also, since object node N33 is on object geometric surface F8, object geometric surface F8 is stored for the feature correlation data 105 for object node N33.

All object nodes N1-N33 on the outer surfaces of the object analytical model data 103 are correlated with geometric elements of the object geometric model data 102 in this way. As a result, the feature correlation data 105 shown in FIG. 15 is created.

(3) Mesh Modifying Module

Various methods for modifying the mesh geometry are available as exemplified by JP-A No. 2006-301753 and JP-A No. 2003-108609 and any method may be used. In this embodiment, the mesh modifying module 108 adopts the following two methods to modify the mesh geometry.

(3)-1 Mesh Parametric Modification

Mesh parametric modification is a method in which the geometric feature (shape) of an outer surface of the object analytical model data 103 is recognized and the geometric parameter for the recognized geometric feature is altered and the object node correlated with the geometric feature is moved so that the geometric feature is represented by the altered geometric parameter. The geometric feature is thus modified.

An example of the mesh geometry modification by the mesh parametric modification method is explained below referring to FIG. 5.

Figure 5:
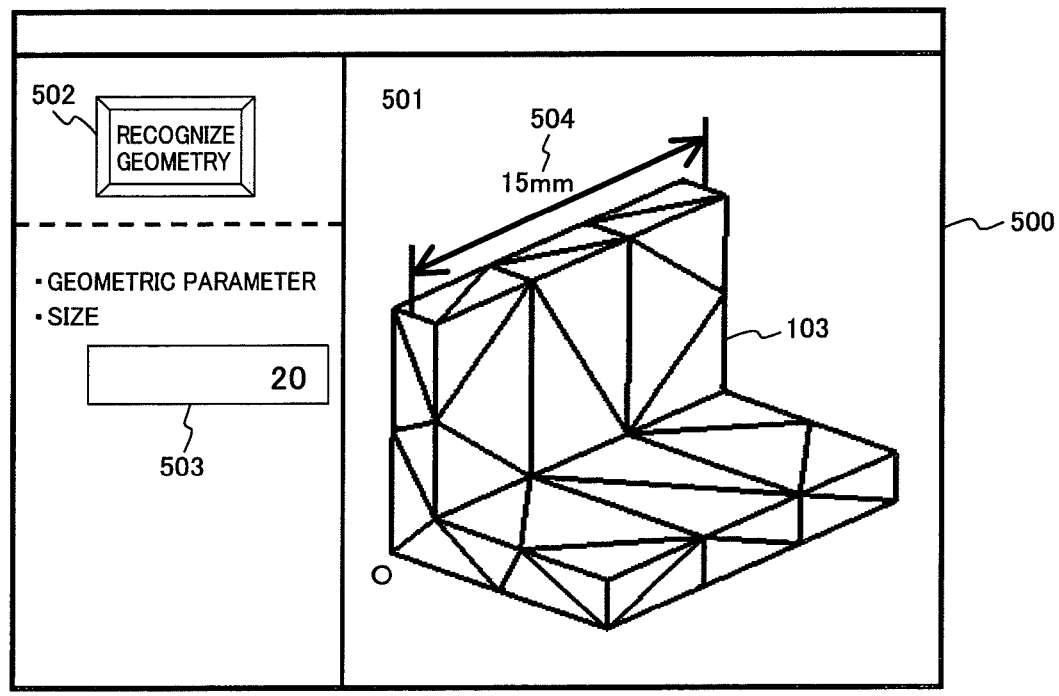
FIG. 5 shows an example of mesh modification (1)
Figure 5:
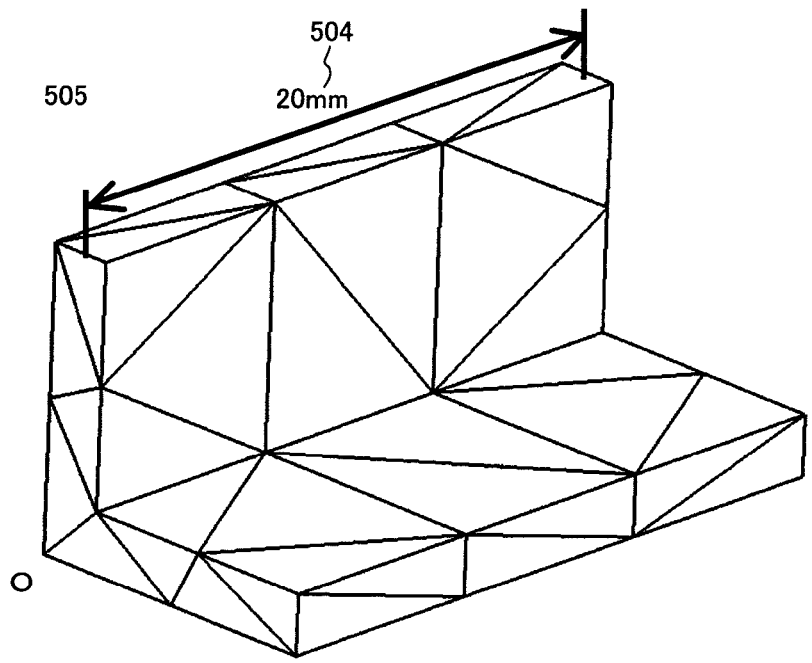

The mesh modifying module 108 displays a mesh modification window 500 as shown in FIG. 5. The mesh modification window 500 includes a RECOGNIZE GEOMETRY button 502 and a new parameter input field 503 and shows the object analytical model data 103 on an operation screen 501.

When the user selects the RECOGNIZE GEOMETRY button 502 using the I/O device 101, the mesh modifying module 108 recognizes the geometric feature of the object analytical model data 103. One method for geometric feature recognition is described in JP-A No. 2006-301753 and the method may be used in this embodiment.

Then, the user selects the geometric feature (for example, size) to alter the geometric parameter and enters size data in the new parameter input field 503 as a new geometric parameter.

The mesh modifying module 108 modifies the object analytical model data 103 according to the entered geometric parameter (size).

In the example shown in FIG. 5, the object analytical model data 103 shown on the operation screen 501 is modified by altering a geometric parameter, where surface F1 passing through the origin O (see FIG. 3) is fixed and the distance to the opposite end surface (distance 504 between the surfaces) is altered from 15 mm to 20 mm. The result is the object analytical model 505 shown in the lower part of FIG. 5. This object analytical model 505 after the mesh modification is stored as the modified analytical model data 107.

(3)-2 Geometric Addition/Deletion

To add a geometry to the object analytical model data 103, the geometry to be added is prepared, mesh for the additional geometry is created, and a Boolean algebra operation is preformed for the mesh of the additional geometry and the premodified mesh. To delete a geometry from the object analytical model data 103, the area to be deleted is selected and the elements in this area are removed and an extrapolated surface is created so as to close the boundary of the deleted area and mesh is added into this boundary.

An example of the method for geometric addition is explained below referring to FIG. 6.

Figure 6:
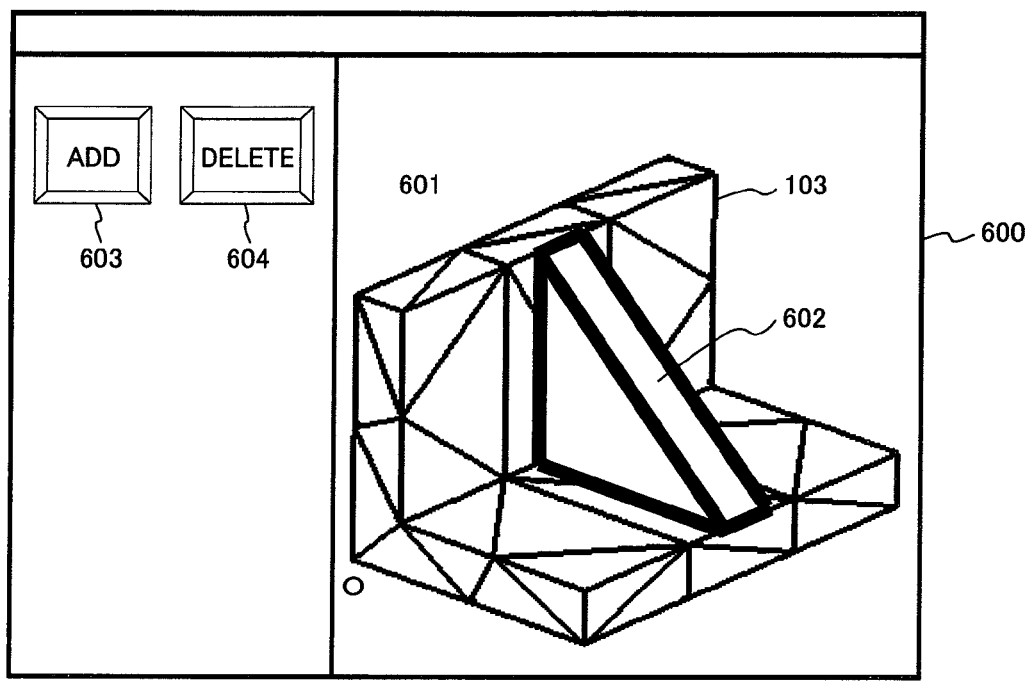
FIG. 6 shows another example of mesh modification (2)
Figure 6:
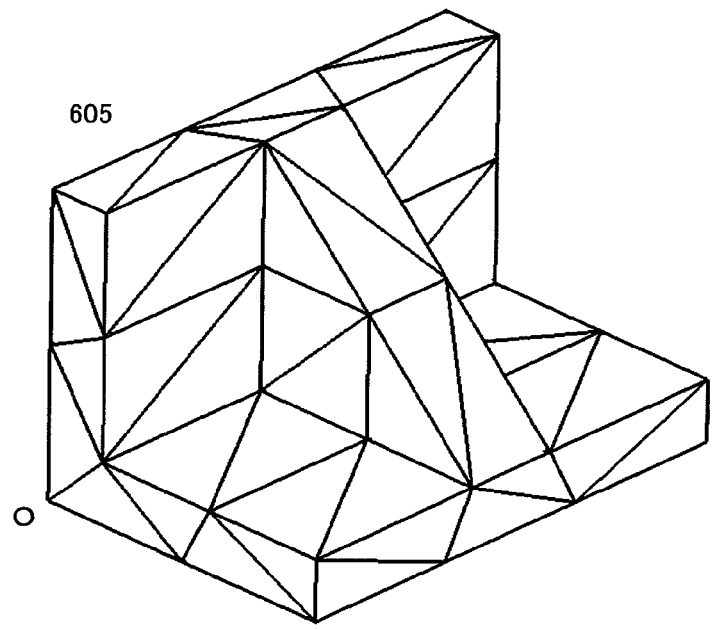

The mesh modifying module 108 displays a geometric addition/deletion window 600 as shown in FIG. 6. The geometric addition/deletion window 600 includes an ADD button 603 and a DELETE button 604 and shows the object analytical model data 103 on an operation screen 601.

The user creates a geometry 602 to add (for example, a rib) and selects the ADD button 603.

The mesh modifying module 108 performs mesh creation for the additional geometry and Boolean algebra operation as mentioned above, and adds the geometry 602 to the object analytical model data 103. The result of this modification is the object analytical model 605 shown in the lower part of FIG. 6. This object analytical model 605 after the geometric addition is stored as the modified analytical model data 107.

To delete a geometry from the object analytical model data 103, the user selects an area to delete by using the I/O device 101 and selects the DELETE button 604. Then the mesh modifying module 108 deletes the geometric area, removing elements in the area being deleted as mentioned above.

For geometric addition or deletion, or Boolean algebra operation for the mesh, the method described in JP-A No. 2006-301753 may be used.

(4) Geometric Model Modifying Module

Figure 12:
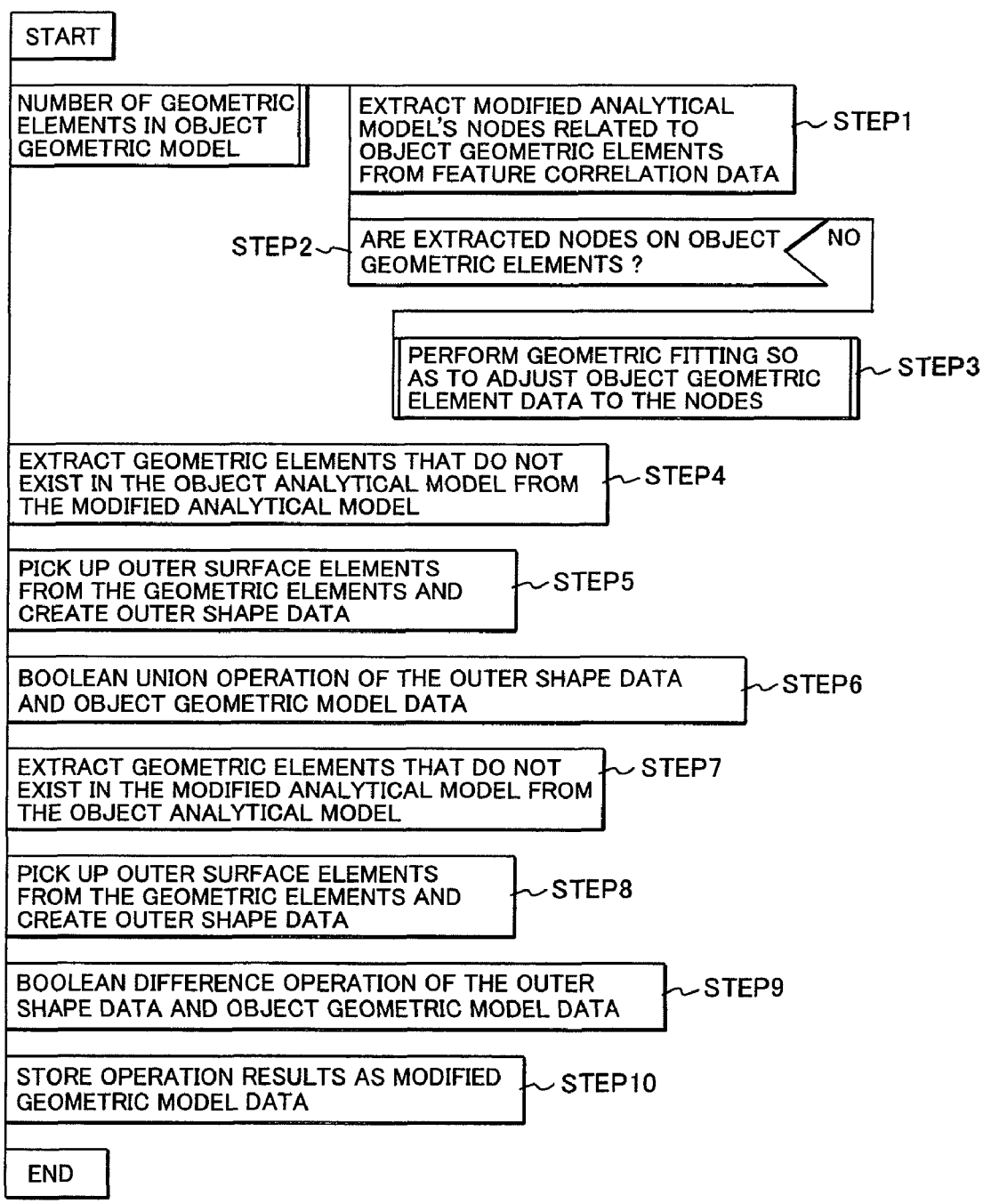
FIG. 12 is a PAD flowchart of a geometric model modifying module.

The processing sequence which is performed by the geometric model modifying module 110 is explained below referring to FIG. 12. The sequence includes STEP 1 to STEP 10. STEP 1 to STEP 3 concern the process for geometric elements modified by mesh parametric modification in the mesh modifying module 108; STEP 4 to STEP 6 concern the process for geometric elements added by the mesh modifying module 108; and STEP 7 to STEP 9 concern the process for geometric elements deleted by the mesh modifying module 108.

First, those nodes in the modified analytical model data 107 which are related to geometric element data of the object geometric model data 102 (object geometric element data) are extracted from the feature correlation data 105 (STEP 1). Object geometric elements are processed in the order of geometric points, geometric lines, and geometric surfaces.

Then, it is checked whether the coordinates of each extracted node in the modified analytical model are included in the coordinates of an object geometric element (STEP 2). If it is determined that the extracted node is not included in the coordinates of an object geometric element (namely the coordinates do not coincide), the node is a node on the mesh modified by the mesh modifying module 108. For example, analytical model nodes N11-N20 are extracted as nodes related to geometric points P7-P12, geometric lines E7-E12, and geometric surface F2 among the geometric elements shown in FIG. 3, and the coordinates of these nodes in the modified analytical model do not coincide with the coordinates of the above related geometric elements, so the nodes are nodes on the mesh modified by the mesh modifying module 108.

In order to fit the object geometric model data 102 to the modified analytical model data 107 geometrically, geometric fitting is performed so as to adjust the object geometric element data to the positions of the above nodes (STEP 3). Geometric fitting will be described later.

The object geometric elements which are subject to geometric fitting are displayed highlighted on the I/O device 101 through the modification highlighting module 111.

Next, if the modified analytical model data 107 includes geometric elements that do not exist in the object analytical model data 103, they are extracted (STEP 4). The extracted geometric elements are geometric elements added by the mesh modifying module 108.

Outer surface elements are picked up from this group of the geometric elements to create outer shape data (STEP 5).

Geometric Boolean union operation of the outer shape data and the object geometric model data 102 is performed (STEP 6). Consequently the outer shape data of geometric elements added by the mesh modifying module 108 is added to the object geometric model data 102.

The outer shape data added to the object geometric model data 102 is displayed highlighted on the I/O device 101 through the modification highlighting module 111.

Next, if the object analytical model data 103 includes geometric elements that do not exist in the modified analytical model data 107, they are extracted (STEP 7). The extracted geometric elements are geometric elements deleted by the mesh modifying module 108.

Outer surface elements are picked up from the group of the geometric elements to create outer shape data (STEP 8).

Geometric Boolean difference operation of the outer shape data and object geometric model data 102 is performed (STEP 9). The outer shape data of the geometric elements deleted by the mesh modifying module 108 is deleted from the object geometric model data 102.

The outer shape data being deleted from the object geometric model data 102 is displayed highlighted on the I/O device 101 through the modification highlighting module 111.

Lastly, the results of the geometric fitting and the geometric Boolean algebra operations made at STEP 1 to STEP 9 are stored as the modified geometric model data 109 (STEP 10).

Figure 13:
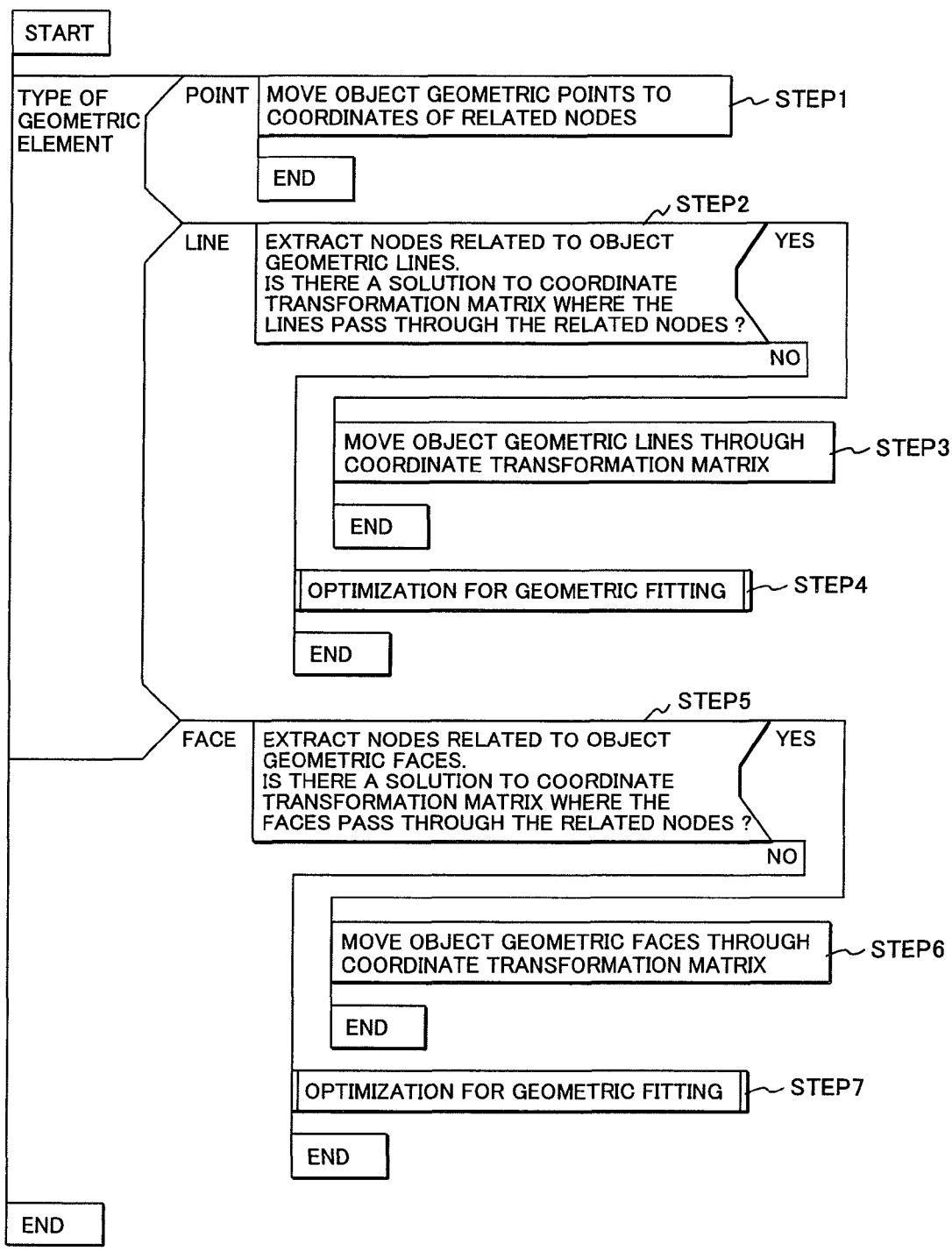
FIG. 13 is a PAD flowchart for geometric fitting.
Figure 14:
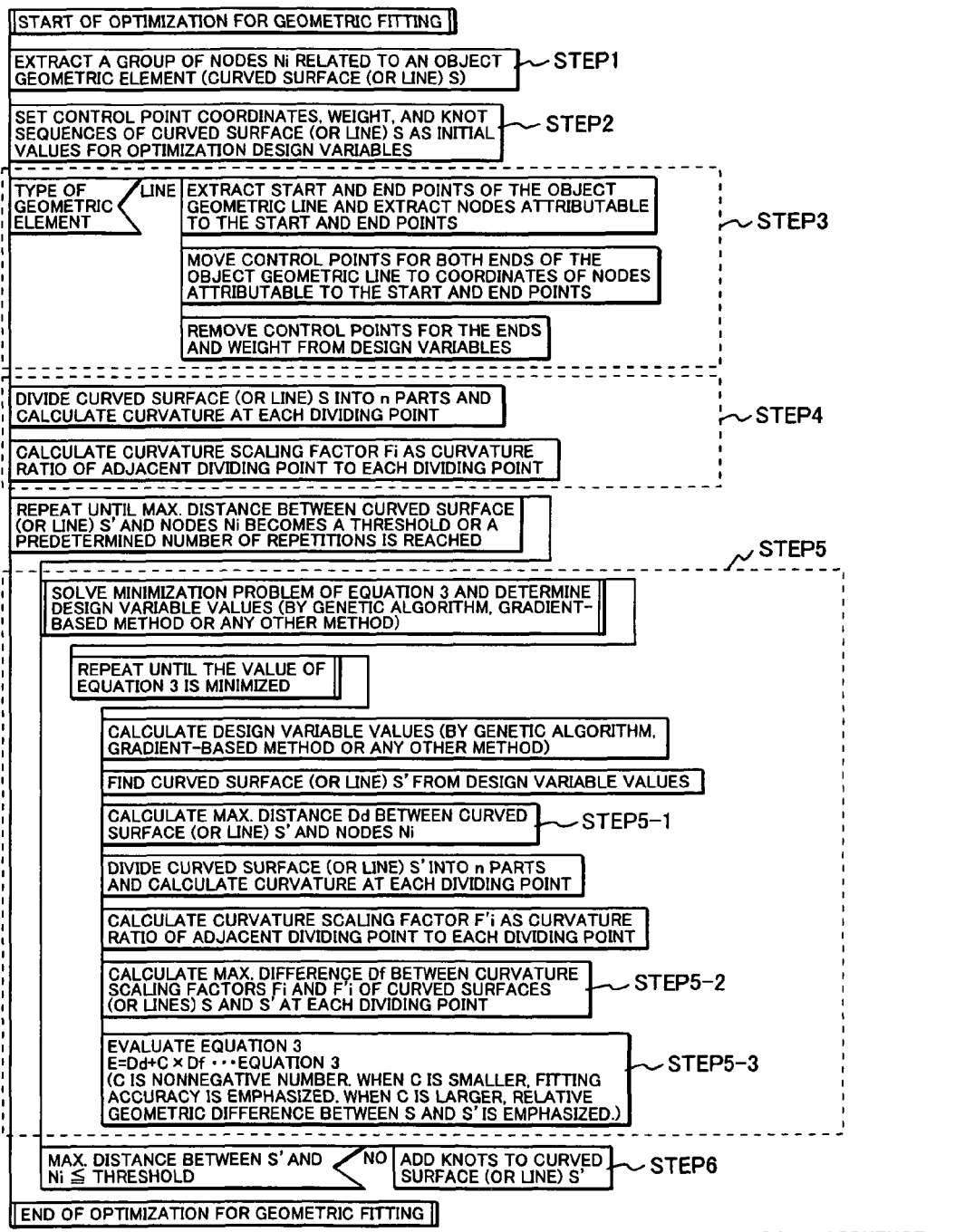
FIG. 14 is a PAD flowchart for optimization for geometric fitting.
Figure 14:
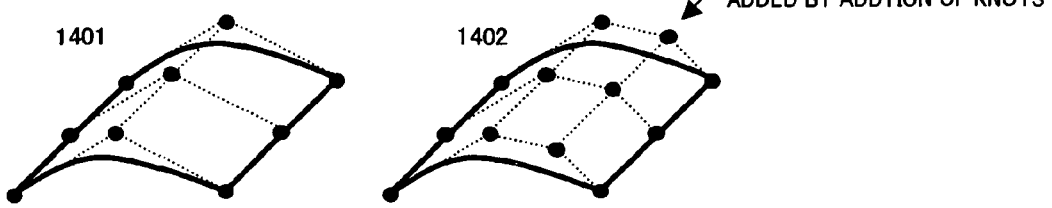

An example of the above geometric fitting process is explained below referring to FIGS. 13 and 14. Geometric fitting is a process of geometrically adjusting the object geometric model data 102 to the modified analytical model data 107. The nodes extracted at STEP 1 in FIG. 12 are called "related nodes."

First, if object geometric elements are points, the points (object geometric points) are moved to the coordinates of their respective related nodes (STEP 1).

If object geometric elements are lines, the lines (object geometric lines) are moved by coordinate transformation in accordance with Equation 1 below. First, nodes related to the object geometric lines are extracted and it is checked whether there is a solution to the coordinate transformation matrix where the object geometric lines pass through the related nodes (STEP 2). The coordinate transformation matrix is expressed by the 4×4 matrix in the center of Equation 1 and calculated by solving a simultaneous linear equation.

$$[X\ Y\ Z\ 1]\begin{bmatrix} a & b & c & d \\ e & f & g & h \\ i & j & k & l \\ m & n & o & p \end{bmatrix} = [X'\ Y'\ Z'\ 1] \quad \text{Equation 1}$$

where [X Y Z 1] represents the coordinates of the object geometric model data 102 (coordinates of the nodes before transformation) and [X' Y' Z' 1] represents the coordinates of the related nodes (coordinates of the nodes after transformation).

If there is a solution to the coordinate transformation matrix, the object geometric lines are moved through the coordinate transformation matrix (STEP 3).

If there is no solution, optimization for geometric fitting is performed (STEP 4). This step will be detailed later.

If object geometric elements are surfaces, coordinate transformation is made in accordance with Equation 1 as when object geometric lines are lines. Nodes related to the object geometric surfaces are extracted and it is checked whether there is a solution to the coordinate transformation matrix where the object geometric surfaces pass through the related nodes (STEP 5).

If there is a solution to the coordinate transformation matrix, the object geometric surfaces are moved through the coordinate transformation matrix (STEP 6).

If there is no solution, optimization for geometric fitting is performed (STEP 7).

The process of optimization for geometric fitting is explained below referring to FIG. 14.

Generally, surfaces and lines of geometric elements are expressed in the NURBS (Non-Uniform Rational B-Spline) form. For example, a NURBS curved surface is expressed by Equation 2 below.

$$S(u, v) = \frac{\sum_{k=0}^{n}\sum_{l=0}^{m} N_{k,p}(u) N_{l,q}(v) w_{kl} P_{kl}}{\sum_{k=0}^{n}\sum_{l=0}^{m} N_{k,p}(u) N_{l,q}(v) w_{kl}}. \quad \text{Equation 2}$$

$N_{k,p}$ (u): B-Spline basis function in the u parameter direction
$N_{l,q}$ (v): B-Spline basis function in the v parameter direction
$w_{kl}$: Control point weight
$P_{kl}$: Coordinates of a control point of a NURBS curved surface
$u_i$, $v_j$: Knot sequences in the u and v directions, respectively
p, q: Order
n: Number of control points in the u direction
m: Number of control points in the v direction The shape of a NURBS curved surface depends on the control point coordinates, weight, and knot sequences which are parameters in Equation 2. The control point coordinates, weight, and knot sequences are referred to as design variables. The design variables are adjusted as described below so that the distance between the curved surface (or line) of an object geometrical element and the group of related nodes and the difference in relative geometric between before and after fitting are minimized.

First, a group of nodes Ni related to the object geometric element (curved surface (or line) S) are extracted (STEP 1).

Then, the control point coordinates, weight, and knot sequences of the curved surface (or line) S are set as initial values for the design variables to solve the minimization problem (STEP 2).

Then, if the type of geometric element is a geometric line, the start and end points of the object geometric line are extracted and nodes attributable to the start and end points (nodes in the modified analytical model data 107 corresponding to the start and end points) are extracted. The control points for both ends of the object geometric line are moved to the coordinates of the nodes attributable to the start and end-points. The control points for the ends and weight are excluded from the design variables (STEP 3).

Then, the curved surface (or line) S is divided into n parts, curvature Ci at each dividing point i is calculated, and curvature scaling factor Fi is calculated (STEP 4). Curvature scaling factor Fi is the ratio of curvature Ci at dividing point i to curvature Cj at adjacent dividing point j and calculated in accordance with the equation below.

$$Fi = \max\left|\frac{C_i}{C_j} - 1.0\right|$$

In this example, minimization of the difference in curvature scaling factor Fi between before and after fitting is defined as minimization of relative geometric difference.

Then, the subsequent procedure described below are repeated until the maximum distance between curved surface (or line) S' and the group of related nodes Ni becomes a predetermined threshold or less or until a predetermined number of repetitions is reached. Here, the curved surface (or line) S' is a curved surface (or line) after fitting.

The minimization problem of Equation 3 is solved and design variables (control point coordinates, weight, and knot sequences) are determined (STEP 5). Various methods for solving the minimization problem (including genetic algorithm and gradient-based method) are available and any one of them may be used.

$$E = Dd + C \times Df \quad \text{Equation 3}$$

Evaluation of Equation 3 (Sub-step 5-3) is made as follows. Dd represents the maximum distance between post-fitting curved surface (or line) S' and the group of related nodes Ni (calculated at Sub-step 5-1); C represents a coefficient; and Df represents the maximum difference between curvature scaling factor Fi of pre-fitting curved surface (or line) S and curvature scaling factor F'i of post-fitting curved surface (or line) S' (calculated at Sub-step 5-2). Coefficient C is an arbitrary nonnegative real number. The smaller the coefficient C is, the more emphasized the fitting accuracy (maximum distance between curved surface (or line) and the group of nodes) is, and the larger C is, the more emphasized the relative geometric difference between curved surfaces (or lines) before and after fitting (maximum difference between curvature scaling factors) is.

Solving the minimization problem of Equation 3 minimizes the distance between the object geometric element curved surface (or line) and the group of related nodes, and minimizes the relative geometric difference between before and after fitting.

On the other hand, if there is a considerable geometric difference between modified mesh and pre-modified mesh, it may not be enough just to solve the above minimization problem. For example, suppose that mesh modification changes a flat surface into a cylindrical surface. While a flat surface is expressed by at least four control points, at least eight control points are required to express a cylindrical surface. In other words, the cylindrical surface cannot be expressed merely by adjusting the four control points for the flat surface.

Therefore, after the above minimization problem is solved, if the maximum distance between the post-fitting curved surface (or line) and the group of related nodes is equal to a predetermined threshold or less, knots are freely added to the curved surface (or line) to improve the resolution in its expression (STEP 6).

If the object geometric element is a curved surface, knots are added in either or both of the u direction and v direction of the NURBS parameter space. When one knot is added, one sequence of control points is added (in FIG. 14, curved surfaces 1401 and 1402 are surfaces before and after knot addition, respectively).

If the object geometric element is a curved line, knots are added in the u direction of the NURBS parameter space. When one knot is added, one control point is added.

Geometric fitting is thus performed by repeating STEP 5 (solution of the minimization problem of Equation 3) and STEP 6 (addition of knots) until the maximum distance between the curved line (or line) and the group of related nodes becomes a predetermined threshold or less or a predetermined number of repetitions is reached.

The above explanation assumes that the type of geometric element is a geometric line. If the type of geometric element is a geometric surface, optimization for geometric fitting can be performed by carrying out the above steps on geometric lines constituting a geometric surface.

Next, the process which is performed by the geometric model modifying module 110 is explained by taking the mesh modification shown in FIG. 5 as an example. Here, the object geometric model data corresponding to the object analytical model data 103 on the operation screen 501 in FIG. 5 is the object geometric model 301 in FIG. 3 and the explanation will be made on the assumption that the feature correlation data 105 has been previously prepared by the feature correlating module 106 (FIG. 15).

First, nodes in the modified analytical model data 107 are retrieved from the feature correlation data 105, and object geometric elements whose coordinates do not include the nodes are extracted. In the examples of FIGS. 3 and 5, surface F2, lines E7-E12, and points P7-P12 are extracted as such geometric element data. The extracted geometric element data is displayed highlighted on the I/O device 101 through the modification highlighting module 111.

Figure 7:
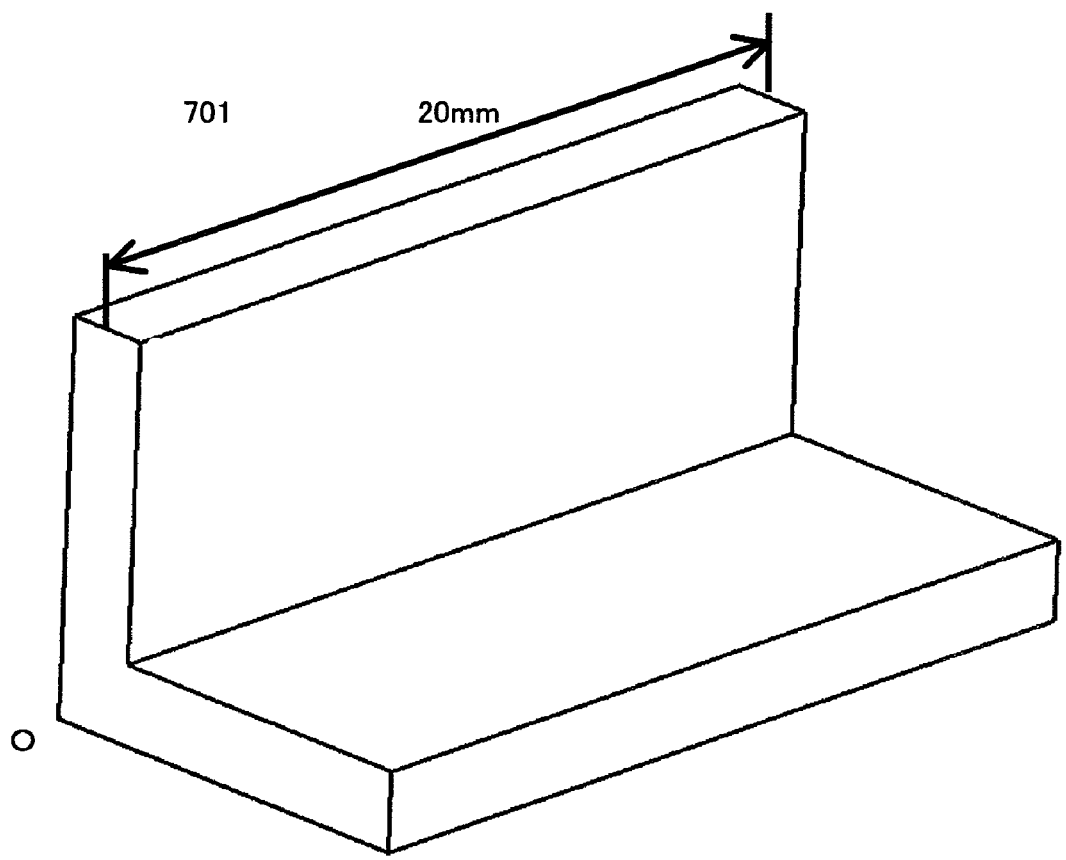
FIG. 7 shows an example of a modified geometric model (1)

Then, geometric fitting is performed so that the geometric elements pass through their respective related nodes (nodes on the mesh modified by the mesh modifying module 108). As a result, a modified geometric model 701 as shown in FIG. 7 is created.

Figure 8:
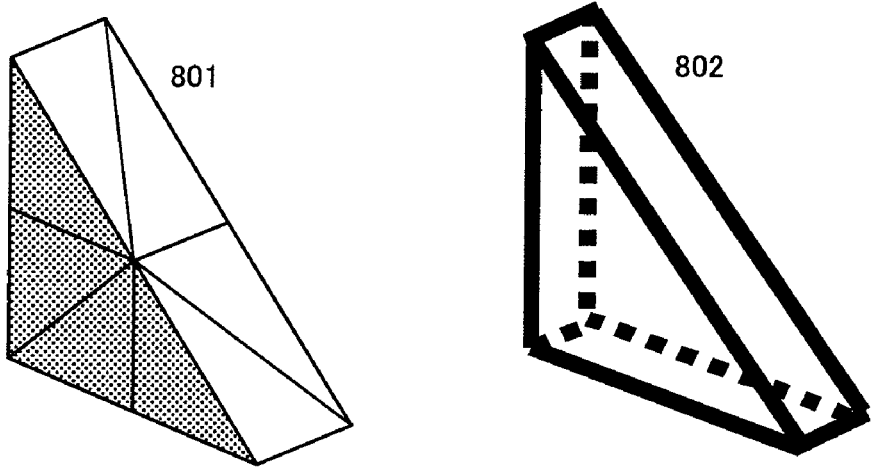
FIG. 8 shows another example of a modified geometric model (2)
Figure 8:
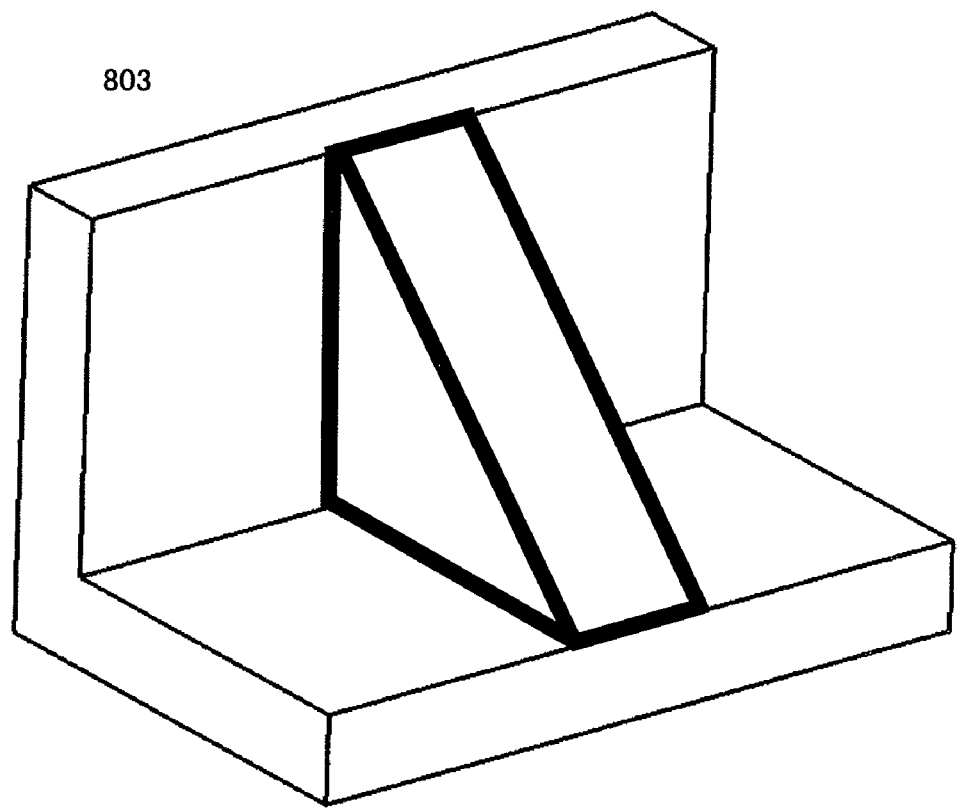

With reference to FIG. 8, the process which is performed by the geometric model modifying module 110 is explained by taking the mesh modification shown in FIG. 6 as an example. The object analytical model data 103 on the operation screen 601 in FIG. 6 is the same as the object analytical model 401 in FIG. 4, and the object geometric model data 102 corresponding to the object analytical model data 103 is the object geometric model 301 in FIG. 3. The explanation will be made on the assumption that the feature correlation data 105 has been previously prepared by the feature correlating module 106 (FIG. 15).

First, comparison is made between the object analytical model data 103 (401 in FIG. 4) and the modified analytical model data 107 (605 in FIG. 6) and added elements (elements which exist only in the modified analytical model data 107) and deleted elements (elements which exist only in the object analytical model data 103) are extracted and outer shape data is created from the added and deleted elements. In this example, the elements of the added rib (602 in FIG. 6) are extracted (801 in FIG. 8) and an outer shape which coincides with the outer surfaces of the elements of the rib is created (802 in FIG. 8).

A modified geometric model 803 is created as shown in FIG. 8 by performing Boolean union operation (geometric Boolean union operation) on the outer shape 802 and the object geometric model 301 (FIG. 3). The added outer shape 802 in the modified geometric model 803 is displayed highlighted on the I/O device 101 through the modification highlighting module 111.

In this example, since only the added elements are extracted, geometric Boolean union operation is made; if deleted elements are extracted, geometric Boolean difference operation is made with the deleted elements and the outer shape data is deleted from the object geometric model data 102.

The object geometric model data 102 can also be automatically modified using an API or a macro for a CAD system.

2. Application of the Geometric Modeling System (Example 1)

Figure 9:
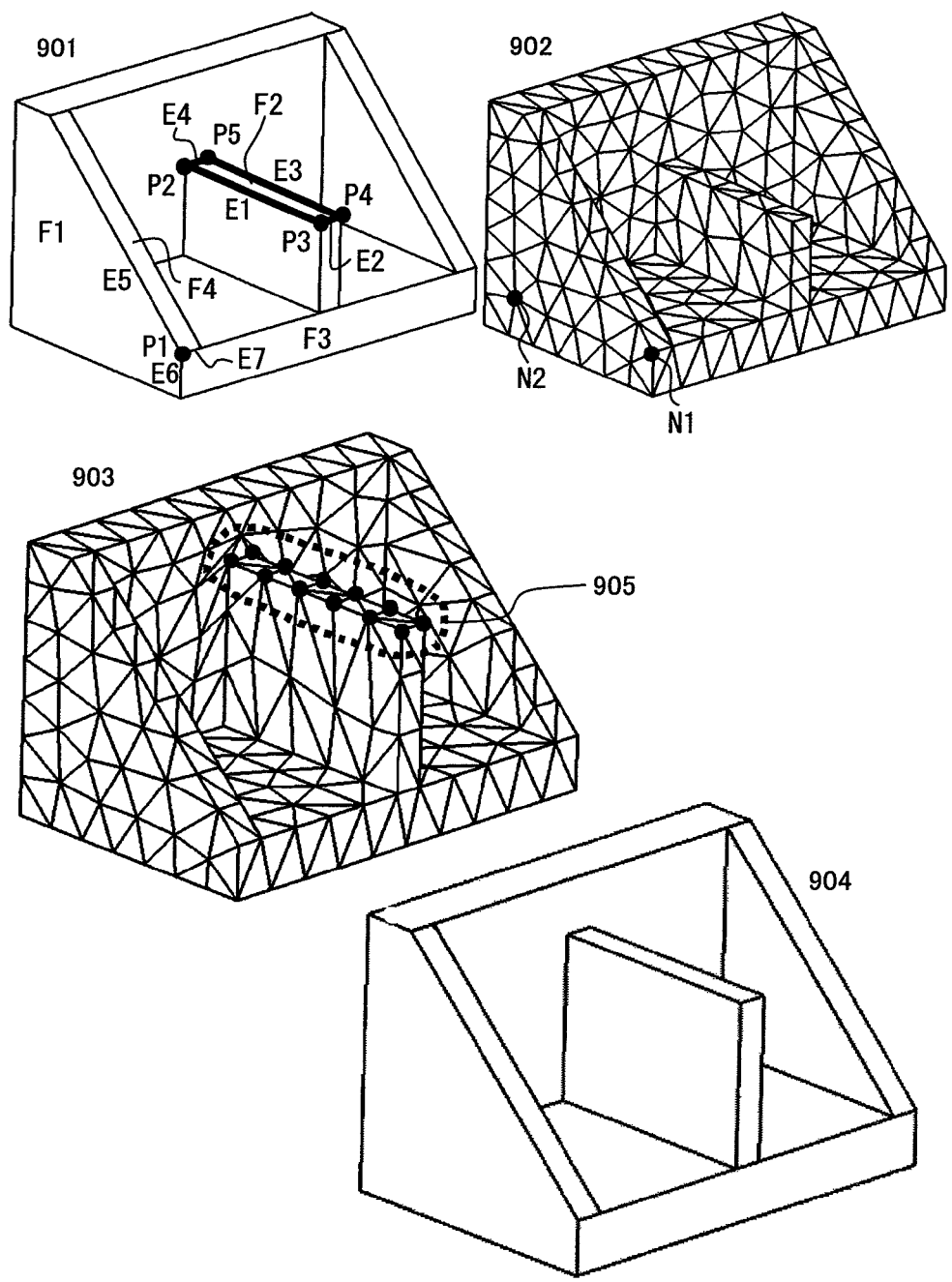
FIG. 9 shows an application example of the geometric modeling system (1)

An example of series of steps for application of the geometric modeling system is explained below referring to FIG. 9. FIG. 9 shows an object geometric model 901 and an object analytical model 902. The object analytical model 902 is modified with the following procedure and the object geometric model 901 is also modified in conjunction with this modification.

First, the user specifies the object geometric model 901 and the object analytical model 902 for the object geometric model data 102 and the object analytical model data 103, respectively, through the object model specifying window 200 (FIG. 2) which is shown by the object model specifying module 104.

Then, the system finds out which nodes of outer surfaces of the object analytical model 902 are included in which surfaces, lines and points in the object geometric model 901, and stores relations between the nodes and geometric elements for the feature correlation data 105. For example, node Ni is related to point P1, lines E5-E7, and surfaces F1, F3, and F4, and node N2 is related to surface F1.

Then, the user modifies the object analytical model 902 using the mesh modifying module 108. The explanation given below is based on the assumption that the height of the projecting part in the center of the model has been changed from 2 mm to 4 mm and an analytical model 903 thus modified has been stored.

Then, the system retrieves nodes in the modified analytical model 903 related to the geometric elements of the object geometric model 901 from the feature correlation data 105, checks whether these nodes (related nodes) are included in the object geometric elements, and extracts the object geometric elements which do not include the related nodes. In this example, it is determined that a group of nodes 905 are related nodes which are not on the following geometric elements: points P2-P5, lines E1-E4, and surface F2. Hence, points P2-P5, lines E1-E4, and surface F2 are extracted. These extracted geometric elements are displayed highlighted on the I/O device 101 through the modification highlighting module 111.

Next, the system performs geometric fitting so as to fit the extracted geometric elements to the group of related nodes 905. As a result, a modified geometric model 904 is created and stored as the modified geometric model data 109.

Consequently, the geometric model reflects the result of analytic model modification, namely the geometric model is modified in conjunction with modification of the analytical model.

3. Application of the Geometric Modeling System (Example 2)

Figure 10:
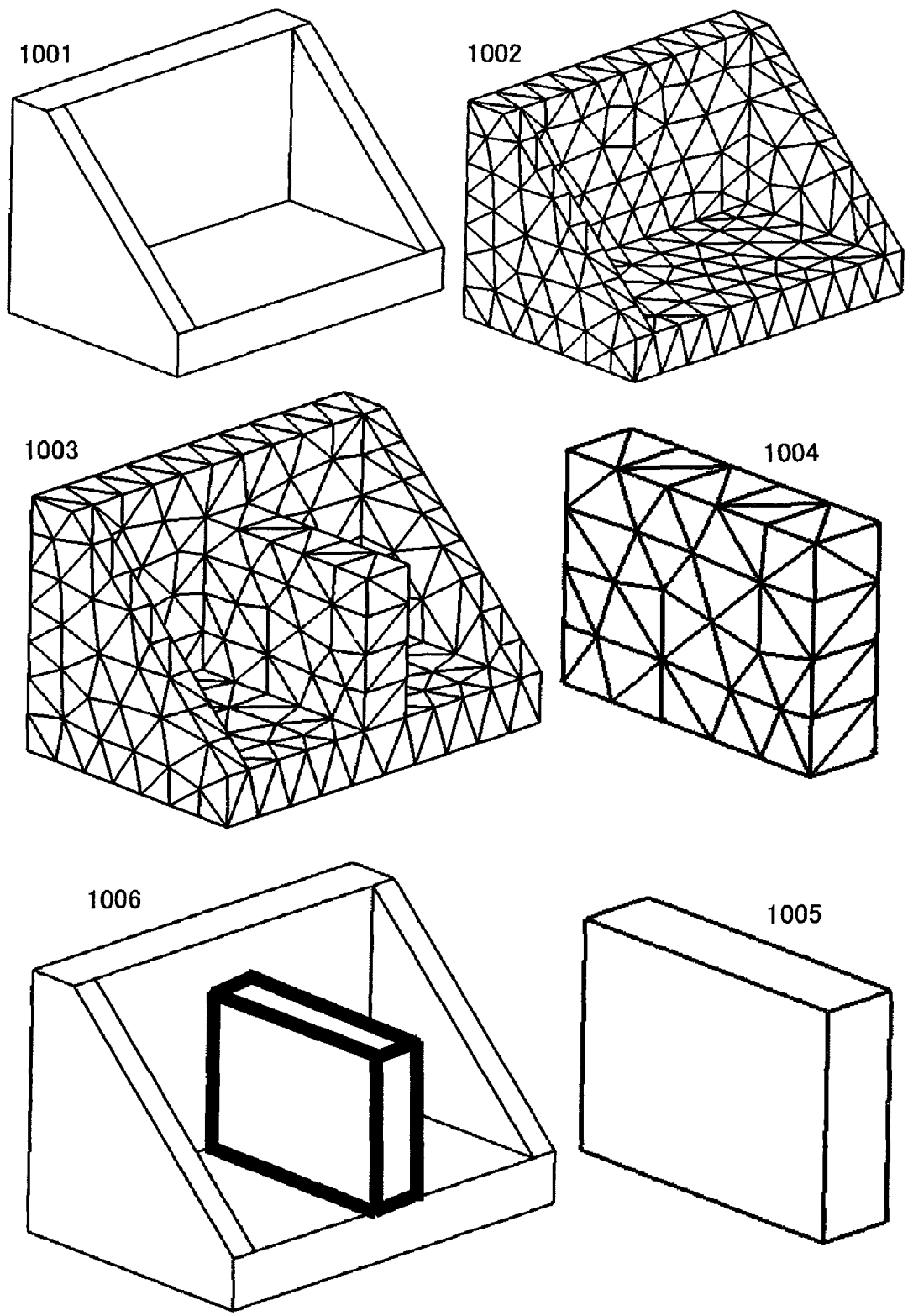
FIG. 10 shows another application example of the geometric modeling system (2)

Another example of a series of steps for application of the geometric modeling system is explained below referring to FIG. 10. An object analytical model 1002 shown in FIG. 10 is modified with the following procedure and an object geometric model 1001 is also modified in conjunction with this modification.

First, the user specifies the object geometric model 1001 and the object analytical model 1002 for the object geometric model data 102 and the object analytical model data 103, respectively, through the object model specifying window 200 (FIG. 2) which is shown by the object model specifying module 104.

Then, the user modifies the object analytical model 1002 using the mesh modifying module 108. The explanation given below is based on the assumption that a projecting part has been added to the center of the model and an analytical model 1003 thus modified has been stored.

Then, the system compares the object analytical model 1002 with the modified analytical model 1003 and extracts the added elements (elements which exist only in the modified analytical model 1003) and the deleted elements (elements which exist only in the object analytical model 1002) and creates outer shape data from the added and deleted elements. In this example, the elements 1004 of the added projecting part are extracted. Then the system creates an outer shape 1005 which coincides with the outer surfaces of the projecting part elements 1004.

Then a modified geometric model 1006 is created by performing Boolean union operation (geometric Boolean union operation) on the outer shape 1005 and object geometric model 1001. The added outer shape 1005 in the modified geometric model 1006 is displayed highlighted on the I/O device 101 through the modification highlighting module 111.

Consequently, the geometric model reflects the result of the analytic model modification, namely the geometric model is modified in conjunction with the modification of the analytical model.

What is claimed is:

1. A geometric modeling system comprising:
a processing unit configured for creating a geometric model, and creating a meshed analytical model to analyze the geometric model;
a storage unit for storing the geometric model and the analytical model;
said processing unit being further configured for:
specifying and reading a geometric model to be modified (hereinafter called "object geometric model") and an analytical model to be modified (hereinafter called "object analytical model") from the stored data;
creating and storing correlation data showing relations between geometric elements of the object geometric model and nodes of the object analytical model;
modifying the object analytical model and creating a modified analytical model;
extracting nodes of the modified object analytical model from the correlation data, the nodes being related to geometric elements of the object geometric model, determining whether coordinates of the extracted nodes in the modified object analytical model are included in coordinates of the geometric elements of the object geometric model, and extracting geometric elements which do not include the extracted nodes; and
performing a geometric fitting process so as to fit the extracted geometric elements to the nodes, and creating a modified object geometric model from the modified object analytical model.

2. The geometric modeling system according to claim 1, wherein in the geometric fitting process,
provided the extracted geometric elements for geometric fitting (hereinafter called "object geometric elements") are points, the points are moved to the coordinates of the related nodes of the modified object analytical model;
provided the object geometric elements are lines or surfaces, nodes of the modified object analytical model, being related to the lines or surfaces, are extracted, and a solution to a coordinate transformation matrix where the lines or surfaces pass through the related nodes is found; and
provided no solution to the coordinate transformation matrix is found, a minimization problem is solved by adjusting coordinates, weight, and knot sequences of control points as parameters in an equation expressing a NURBS (Non-Uniform Rational B-Spline) curved line or curved surface, and minimizing distance between the curved line or curved surface in the object geometrical elements and a group of related nodes and relative geometric difference between before and after the fitting process.

3. The geometric modeling system according to claim 2, further comprising:
a display device,
wherein said processing unit is further configured for:
extracting nodes of the modified object analytical model from the correlation data, the nodes being related to the geometric elements of the object geometric model, determining whether the coordinates of the extracted nodes are included in the coordinates of the geometric elements of the object geometric model, and extracting geometric elements which do not include the extracted nodes; and
highlighting the extracted geometric elements through the display device.

4. The geometric modeling system according to claim 1, wherein the system is configured to extract geometric elements which do not exist in a pre-modified object analytical model from the geometric elements of the modified object analytical model, pick up outer surface elements from a group of the extracted geometric elements to create outer shape data, and perform Boolean union operation of the outer shape data and the object geometric model data to create the modified object geometric model.

5. The geometric modeling system according to claim 4, further comprising:
a display device; and
means for picking up outer surface elements from the group of the extracted geometric elements, creating outer shape data, and highlighting the outer shape data through the display device.

6. The geometric modeling system according to claim 1, wherein the system is configured to extract geometric elements which do not exist in the modified object analytical model from the geometric elements of the pre-modified object analytical model, pick up outer surface elements from the group of the extracted geometric elements to create outer shape data, and perform Boolean difference operation of the outer shape data and the object geometric model data to create the modified object geometric model.

7. The geometric modeling system according to claim 6, further comprising:
   a display device; and
   means for picking up outer surface elements from the group of the extracted geometric elements, creating outer shape data, and highlighting the outer shape data through the display device.

8. The geometric modeling system according to claim 1, further comprising:
   a display device,
   wherein said processing unit is further configured for:
   extracting nodes of the modified object analytical model from the correlation data, the nodes being related to the geometric elements of the object geometric model, determining whether the coordinates of the extracted nodes are included in the coordinates of the geometric elements of the object geometric model, and extracting geometric elements which do not include the extracted nodes; and
   highlighting the extracted geometric elements through the display device.

9. An optimization method performed by a computer for geometric fitting to fit geometry of a geometric model created by a CAD system to geometry of a modified analytical model created by modifying an analytical model for analyzing the geometric model, the method comprising the steps of:
   calculating distance between a curved surface or curved line as a geometric element of the geometric model and nodes in the modified analytical model;
   dividing the curved surface or curved line and calculating a curvature scaling factor from curvatures at dividing points adjacent to each other;
   calculating difference between the curvature scaling factors before and after the optimization for geometric fitting; and
   determining parameters expressing the curved surface or curved line so as to minimize the distance and the difference of the curvature scaling factors.

* * * * *